United States Patent
Ferris et al.

(10) Patent No.: US 12,162,733 B2
(45) Date of Patent: Dec. 10, 2024

(54) LANDING PAD FOR A VEHICLE SUPPORT

(71) Applicant: ETN Capital, LLC, Sanford, NC (US)

(72) Inventors: Bruce Seymour Ferris, Richmond, VA (US); Christopher Scott Murray, Richmond, VA (US); Jonathan Randall Kyte, Glen Allen, VA (US)

(73) Assignee: ETN Capital, LLC, Sanford, NC (US)

( * ) Notice: Subject to any disclaimer, the term of this patent is extended or adjusted under 35 U.S.C. 154(b) by 34 days.

(21) Appl. No.: 18/071,145

(22) Filed: Nov. 29, 2022

(65) Prior Publication Data

US 2024/0174500 A1    May 30, 2024

(51) Int. Cl.
*B66F 13/00* (2006.01)
*B60S 9/02* (2006.01)

(52) U.S. Cl.
CPC .............. *B66F 13/00* (2013.01); *B60S 9/02* (2013.01)

(58) Field of Classification Search
CPC ... B66F 13/00; B60S 9/02; B60S 9/04; F16M 2200/08
See application file for complete search history.

(56) References Cited

U.S. PATENT DOCUMENTS

| | | |
|---|---|---|
| 1,767,134 A | 10/1928 | Huye |
| 2,221,203 A | 11/1940 | Sandberg |
| D133,106 S | 7/1942 | Phillips |
| 2,929,601 A | 3/1960 | Anderson |
| 3,808,084 A | 4/1974 | Doty |
| 4,073,454 A | 2/1978 | Sauber |
| 4,254,927 A * | 3/1981 | Stonhaus ............. B66F 13/00 248/912 |
| D282,241 S | 1/1986 | Sauber |
| 4,577,828 A | 3/1986 | Drucker et al. |
| 4,634,144 A | 1/1987 | Ringe |

(Continued)

FOREIGN PATENT DOCUMENTS

| | | |
|---|---|---|
| CN | 202243230 U | 5/2012 |
| GB | 1387347 A | 3/1975 |

(Continued)

OTHER PUBLICATIONS

"Stromberg Carlson Jack Base Pad (Shoe) Review" video on youtube.com dated Apr. 13, 2021 by Casual RVer, https://www.youtube.com/watch?v=hRNFIOYHCDs (Year: 2021).*

Lippert components hall effect ground control 3.0 rear jack foot pad sold on amazon, first available date: Nov. 29, 2017, https://www.amazon.com/Lippert-Diameter-Powder-Coated-Construction-Installation/dp/B078C6M5FB (Year: 2017).*

(Continued)

*Primary Examiner* — Terrell L McKinnon
*Assistant Examiner* — Ding Y Tan
(74) *Attorney, Agent, or Firm* — COATS & BENNETT, PLLC

(57) ABSTRACT

A landing pad that mounts to a foot of a vehicle support. The landing pad includes a bottom with an opening. A side wall extends upward from the bottom with the side wall positioned around a perimeter of the bottom. A top shelf extends radially inward towards the opening from the side wall with the top shelf extending over and being spaced away from the bottom. One or more slots extend from the top shelf to the opening. Each of the one or more slots includes a first section that extends into a lower surface of the top shelf and a second section that extends into a top surface of the bottom with the first section and the second section of each of the one or more slots being aligned to direct water to the opening.

17 Claims, 7 Drawing Sheets

(56) References Cited

U.S. PATENT DOCUMENTS

| | | | |
|---|---|---|---|
| 4,832,163 A * | 5/1989 | Levesque | A45B 3/00 |
| | | | 108/14 |
| D304,575 S | 11/1989 | Batzel | |
| 5,046,587 A | 9/1991 | Jones | |
| 5,383,639 A | 1/1995 | Byard | |
| 5,419,524 A | 5/1995 | Evans et al. | |
| 5,645,103 A | 7/1997 | Whittaker | |
| 5,685,509 A | 11/1997 | Harrison | |
| 5,738,325 A | 4/1998 | Brown | |
| 6,116,266 A | 9/2000 | Dickison et al. | |
| D531,378 S | 10/2006 | Angel et al. | |
| 7,300,032 B2 | 11/2007 | Williams et al. | |
| D577,648 S | 9/2008 | Shaw | |
| 7,958,967 B2 | 6/2011 | Lambdin | |
| 8,201,506 B1 * | 6/2012 | Parlapiano | E05G 1/005 |
| | | | 70/201 |
| D668,423 S | 10/2012 | Brockington et al. | |
| 8,814,121 B2 | 8/2014 | Koberg | |
| 9,004,309 B1 | 4/2015 | Gardner | |
| 10,266,158 B2 | 4/2019 | Wilson et al. | |
| 2005/0017223 A1 | 1/2005 | Lucas | |
| 2009/0072525 A1 | 3/2009 | Banks | |
| 2015/0028177 A1 | 1/2015 | Vargas | |
| 2016/0325974 A1 * | 11/2016 | Wilson | B60S 9/04 |
| 2019/0217825 A1 * | 7/2019 | Andersen | B60S 9/22 |
| 2021/0291718 A1 * | 9/2021 | Thompson | B60P 3/36 |
| 2022/0061480 A1 * | 3/2022 | Nguyen | A45B 23/00 |
| 2024/0003113 A1 * | 1/2024 | Perkins, II | B66C 23/78 |

FOREIGN PATENT DOCUMENTS

| | | |
|---|---|---|
| GB | 2459533 A | 11/2009 |
| GB | 2501698 A | 11/2013 |
| WO | 03064239 A1 | 8/2003 |

OTHER PUBLICATIONS

"Your GuideTo Understanding Truck Camper Jacks" snappad blog dated Mar. 31, 2022 by Lori Selanders, https://rvsnappad.com/blogs/news/your-guide-to-understanding-truck-camper-jacks (Year: 2022).*

"How to deal with bent RV jacks" dated May 22, 2019 by Kent Wilson, https://rvsnappad.com/blogs/news/dealing-with-bent-jacks-and-snappads (Year: 2019).*

Yinpecly plastic pipe cover dated Jan. 14, 2021 sold on amazon.com, https://www.amazon.com/Yinpecly-Decoration-Plastic-Escutcheon-Radiator/dp/B08TT9W696 (Year: 2021).*

EQ Systems foot pads online page: https://eqsystems.US/product-category/replacement-parts/foot-pads/archive.org dated: Oct. 28, 2021 (Year: 2021).*

Roadwarrior Heavy Duty RV Jack Pad—first available date: May 10, 2019 https://www.amazon.com/RoadWarrior-DICA-Jack-Pads-Diameter/dp/B07DRTHG1P?th=1 (Year: 2019).*

Camco camper rv leveling pad sold on amazon first available date: Dec. 28, 2015, https://www.amazon.com/Camco-44600-Universal-Leveling-Blocks/dp/B016V2JQWI?th=1 (Year: 2015).*

Origen Rv Accessories Ltd., "SnapPads for Your Rig", Retrieved from the internet: URL: https://rvsnappad.com/collections/all?page=1 [retrieved on Nov. 30, 2022], Jan. 1, 2022, pp. 1-37.

* cited by examiner

LANDING PAD FOR A VEHICLE SUPPORT

TECHNICAL FIELD

The present application relates generally to a landing pad configured to attached to a foot of a vehicle support and, more particularly, to a landing pad that comprises first and second sections.

BACKGROUND

Many vehicles such as but not limited to recreational vehicles (RV), trucks, and buses are equipped with support members. The support members are configured to level and/or stabilize the vehicle. One type of support is a hydraulic or manual jack that includes an adjustable support arm with an enlarged foot. During use, the support arm is extended to position the foot against the ground and thereby level and/or stabilize the RV.

Landing pads can be positioned on the feet of the support members. The landing pads can provide adequate contact with the ground and prevent/reduce slipping of the feet. The pads can also enlarge the size of the feet to better distribute the weight of the vehicle. The pads can extend along the edges of the feet to prevent damage to the ground such as when the RV is parked on asphalt which is relatively soft and can be cut by the edges of the feet.

Existing pads have various drawbacks. One issue is the difficult in mounting the pads to the feet. The pads are constructed from relatively rigid material that is difficult to bend or otherwise conform to the foot during attachment. Similarly, the pads may be difficult to remove once they have been mounted to the feet.

Another drawback is existing pads are difficult to clean. The feet (and attached pads) are often positioned on the ground that includes mud, snow/ice, leaves, sticks, etc. This debris can become trapped between the pads and the feet. Because of the relatively tight fit between the pads and feet, it can be difficult to remove the debris. A full cleaning can require that the pad be removed, which is a difficult process as described above.

SUMMARY

One aspect is directed to a landing pad that mounts to a foot of a vehicle support. The landing pad comprises a bottom comprising a central opening. A side wall extends upward from the bottom with the side wall positioned around a perimeter of the bottom. A top shelf extends radially inward towards the central opening from the side wall with the top shelf extending over and being spaced away from the bottom. One or more slots extend from the top shelf to the central opening. Each of the one or more slots comprise a first section that extends into a lower surface of the top shelf and a second section that extends into a top surface of the bottom with the first section and the second section of each of the one or more slots being aligned to direct water to the central opening.

In another aspect, the one or more slots comprise a plurality of slots that are aligned parallel to each other.

In another aspect, the second sections of the one or more slots are sloped towards the central opening.

In another aspect, each of the slots comprise the first section overlapping with the second section.

In another aspect, a receptacle is formed between the bottom and the top shelf at the side wall with the receptacle configured to receive an outer perimeter edge of the foot.

In another aspect, the landing pad comprises a first section configured to be positioned on a first part of the foot and a second section configured to be positioned on a second part of the foot with the first section and the second section being identical in shape and size.

In another aspect, the landing pad comprises identical sections that mate together with each of the sections comprising: a front edge: an extension that extends outward from the front edge; and a receptacle that extends into the front edge: with the extension shaped and sized to fit into the receptacle when the sections are mated together.

In another aspect, each of the sections comprise a cut-out section that form the central opening in the bottom when the sections are mated together.

In another aspect, each of the sections comprise mating features that engage together when the sections are mated together with the mating features forming a dam to prevent water passage from an underside of the landing pad.

One aspect is directed to a landing pad that mounts to a foot of a jack. The landing pad comprises a first section comprising: a first bottom comprising a first top surface and with a first front edge: a first side wall that extends upward from the first bottom with the first side wall positioned along a perimeter of the first bottom away from the first front edge: a first top shelf that extends radially inward from the first side wall with the first top shelf extending over and being spaced away from the first bottom by a first gap. A second section comprises: a second bottom comprising a second top surface and with a second front edge: a second side wall that extends upward from the second bottom with the second side wall positioned along a perimeter of the second bottom away from the second front edge: a second top shelf that extends radially inward from the second side wall with the second top shelf extending over and being spaced away from the second bottom by a second gap. The first section and the second section are configured to be connected together with the first front edge abutting against the second front edge. A continuous bottom section is formed by the first bottom and the second bottom. A continuous side wall is formed by the first and second side walls.

In another aspect, the first section and the second section are identical.

In another aspect, each of the first section and the second section further comprise: a central cut-out in the front edge; a projection that extends outward from the front edge; a receptacle that extends into the front edge; and wherein when the first section and the second section mate together: the central cut-outs align together to form a central opening: the projection of the first section mates with the receptacle of the second section; and the projection of the second section mates with the receptacle of the first section.

In another aspect, each of the first and second sections comprise: a mating projection that extends outward from the front edge and extends between the projection and the central cut-out; and a mating receptacle that extends into the front edge between the receptacle and the central cut-out.

In another aspect, a plurality of slots are formed in each of the first and second sections with each of the slots comprising: a first portion that extends into the respective first and second top shelves: a second portion that extends into the respective first and second bottoms; and the first portions and the second portions aligned in an overlapping arrangement.

In another aspect, each of the first section and the second section comprise openings that are exposed on a top surface with the openings of the first section aligned with the openings of the second section in the mated configuration to receive fasteners.

One aspect is directed to a method of attaching a landing pad to a foot of a vehicle support. The method comprises: sliding in a first direction a first section of the landing pad onto a first part of the landing pad and inserting a perimeter edge of the first part of the landing pad into a first receptacle in the first section; sliding in an opposing second direction a second section of the landing pad onto a second part of the landing pad and inserting a perimeter edge of the second part of the landing pad into a second receptacle in the second section: abutting together front edges of the first and second sections and inserting projections on the front edges into receptacles in the front edges; and inserting one or more fasteners into openings in the first and second sections and connecting together the first and second sections.

In another aspect, the method further comprises inserting the one or more fasteners into the openings from a top side of the first and second sections.

In another aspect, the method further comprises aligning slots in the first and second sections on opposing sides of the landing pad with the slots extending into the first and second sections and configured to drain water from the landing pad.

In another aspect, the method further comprises mating together mating features on the front edges of the first and second sections and creating water blocks and preventing water from passing through the landing pad.

The features, functions and advantages that have been discussed can be achieved independently in various aspects or may be combined in yet other aspects, further details of which can be seen with reference to the following description and the drawings.

DETAILED DESCRIPTION

Figure 1A:
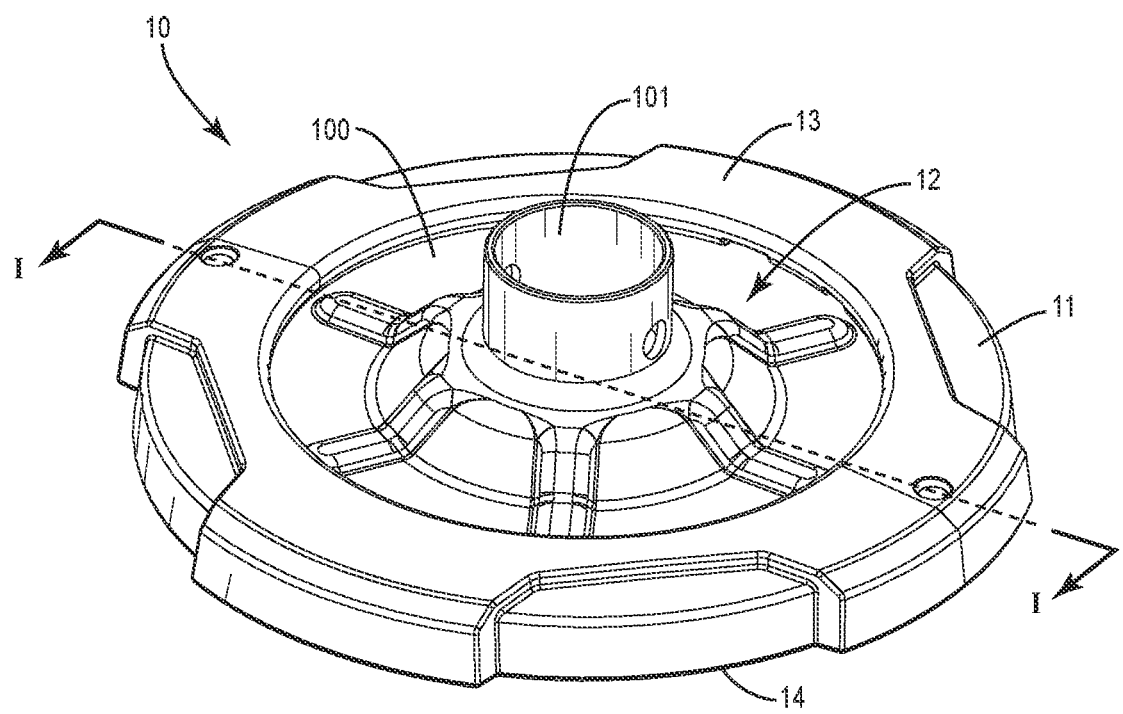
FIG. 1A is a perspective view of a landing pad connected to a foot of a vehicle support.
Figure 1B:
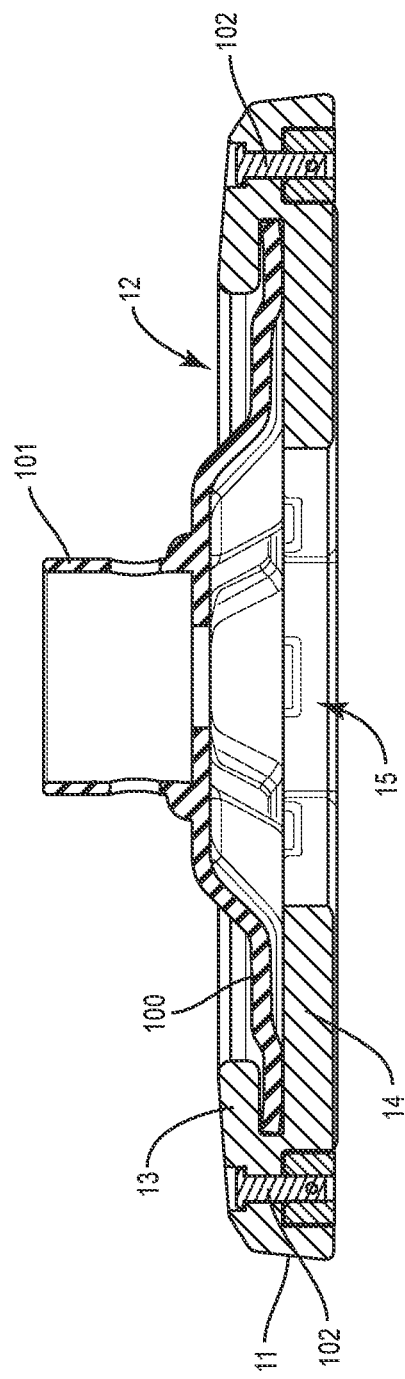
FIG. 1B is a section view cut along line I-I of FIG. 1A illustrating the foot positioned in the landing pad.

FIGS. 1A and 1B illustrate a landing pad 10 mounted to a foot 100 of a vehicle support. The landing pad 10 includes a body 11 that extends around the perimeter of the foot 100. The body 11 includes a top section 13 that extends over a top side of the foot 100, and a bottom section 14 that extends over a bottom side of the foot 100. An opening 12 in the top section 13 provides for an arm 101 that is attached to the foot 100 to extend outward. An opening 15 in the bottom section 14 provides for draining water and/or debris.

Figure 2:
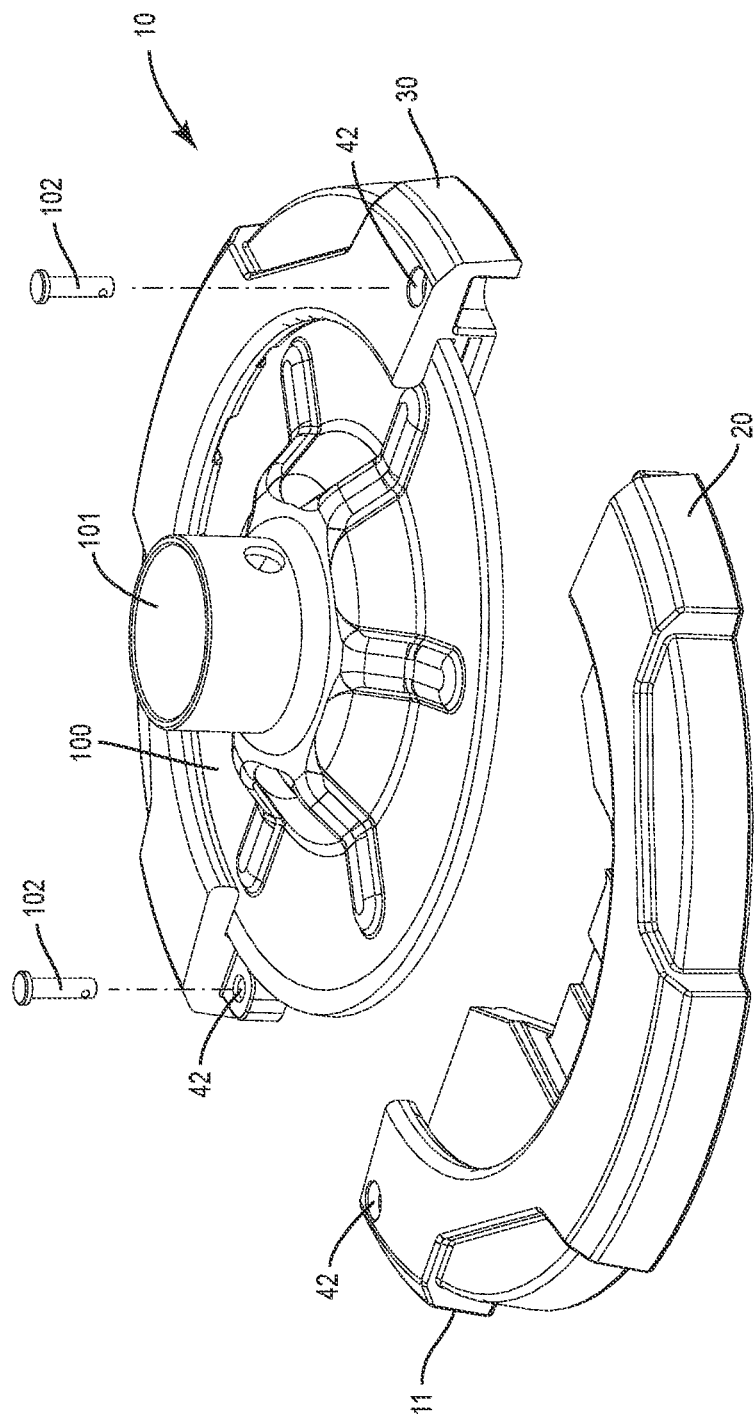
FIG. 2 is an exploded perspective view of the landing pad positioned at a foot of a vehicle support.

As illustrated in FIG. 2, the landing pad 10 includes a first section 20 and a second section 30. The first and second sections 20, 30 extend around different parts of the foot 100. The first and second sections 20, 30 are configured to abut together to form the continuous landing pad 10 that encloses the foot 100. One or more fasteners 102 fit within aligned openings 42 to connect the first and second sections 20, 30.

In one example, the first and second sections 20, 30 are identical. This facilitates manufacturing as it reduces the number of different components of the landing pad 10. This further facilitates attachment to the landing pad 10 because the two pieces are interchangeable. In another example, the first and second sections 20, 30 are not identical and have one or more differences such as different shapes and/or sizes.

Figure 3:
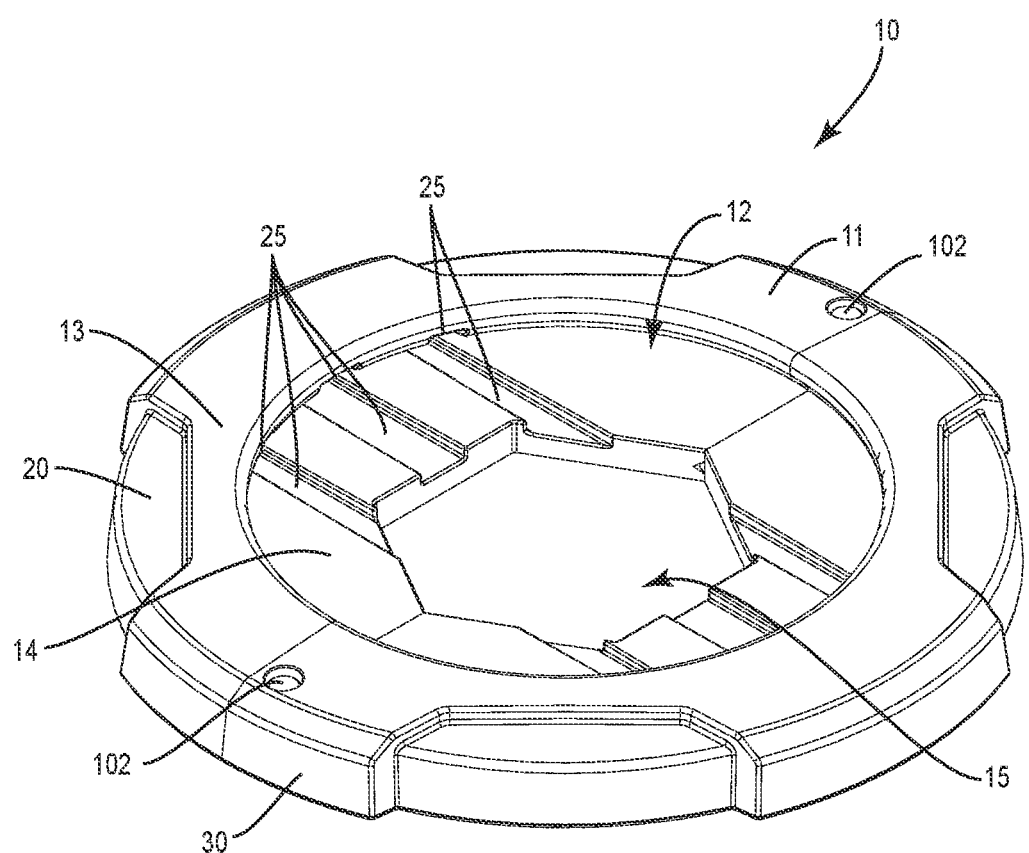
FIG. 3 is a perspective view of a landing pad.

FIG. 3 illustrates the landing pad 10 with the first and second sections 20, 30 connected together with fasteners 102. The landing pad 10 includes the body 11 with the top section 13 and the bottom section 14. The top section 13 extends around an opening 12 and the bottom section 14 extends around an opening 15. The landing pad 10 is configured to drain water through the opening 15. Each of the first and second sections 20, 30 include slots 25 that drain the water into the opening 15. The slots 25 extend along the bottom surface of the top sections 13 and the top surface of the bottom sections 14. During use, water (in the form of one or more of rain, snow, and ice) lands on the foot 100. The water accumulates on the top of the foot and runs into the slots 25 in the top sections 13. The slots 25 direct the water along the top of the foot 100, around the perimeter edge of the foot 100, and into the slots 25 in the bottom sections 14. The slots 25 in the bottom section 14 direct the water to the opening 15.

In one example, each of the slots 25 include a first section formed in the top shelf 23 and a second section formed in the bottom 21. The first and second sections are aligned together in an overlapping configuration.

In one example, the slots 25 in the bottom sections 14 are sloped towards the opening 15. That facilitates directing the water into the opening 15. In another example, the slots 25 in the bottom sections 14 are flat (i.e., non-sloped). The number of slots 25 in the landing pad 10 can vary. FIG. 3 includes an example with three slots 25. Other examples include different numbers of slots 25. In one example, the slots 25 are aligned parallel to each other.

Figure 4:
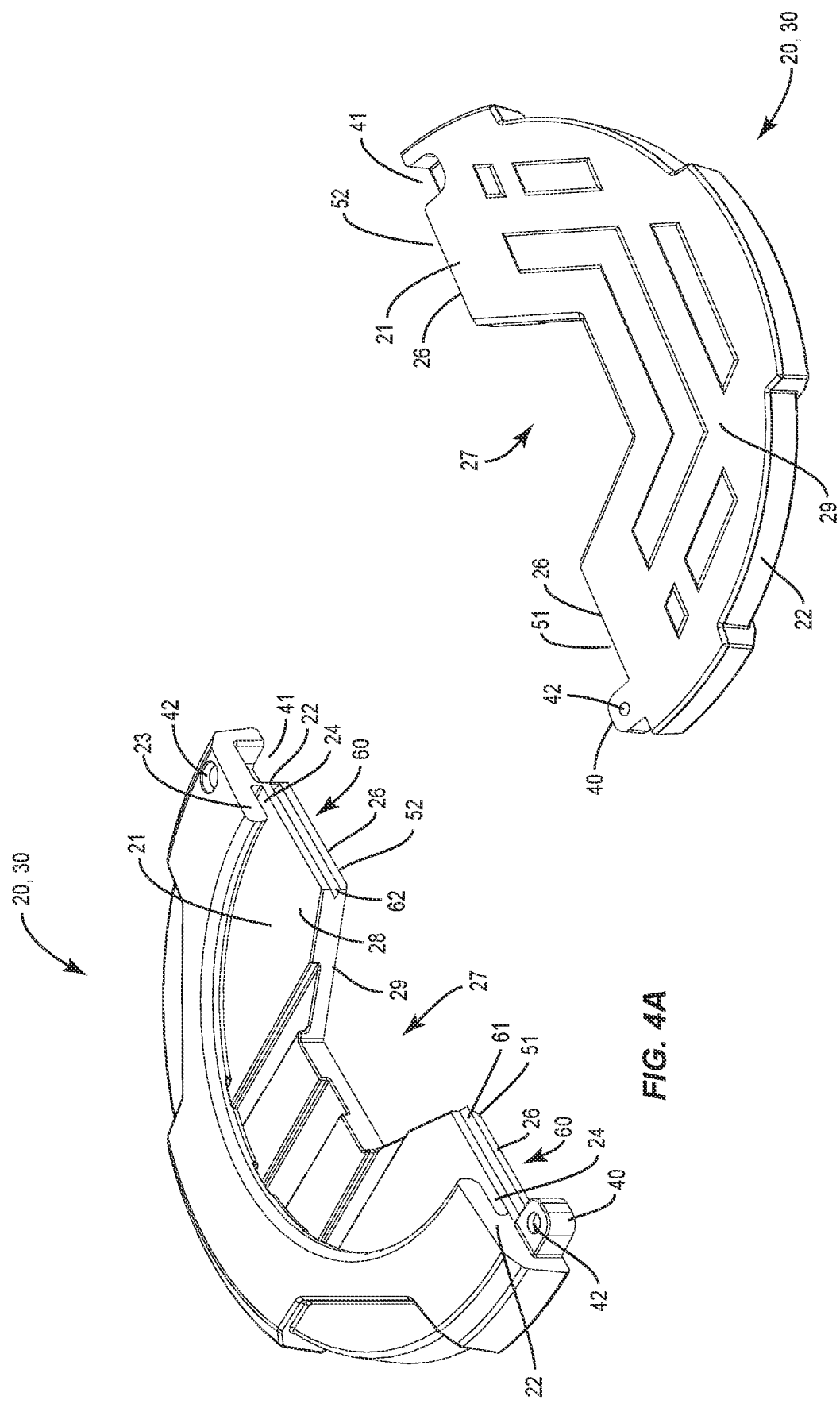
FIG. 4A is a perspective view of a top of the landing pad.
FIG. 4B is a perspective view of a bottom of the landing pad of FIG. 4A.

FIGS. 4A and 4B illustrate one of the first or second sections 20, 30. The sections 20, 30 include a bottom 21, a top shelf 23, and a perimeter side 22. These three sections form a receptacle 24 sized to receive the perimeter edge of the foot 100.

The top shelf 23 extends radially inward from the perimeter side 22. The length of the top shelf 23 can vary provided it is large enough to extend over a portion of the foot 100 to prevent the foot 100 from being removed through the top opening 12. The slots 25 are formed in a lower side of the top shelf 23.

The perimeter side 22 extends between the top shelf 23 and the bottom 21. The perimeter side 22 has a length adequate to space apart the top shelf 23 and the bottom 21 for the receptacle 24 to receive the foot 100. In one example, the slots 25 are formed along a surface of the perimeter side 22. In another example, the slots 25 are not formed in the perimeter side. In this example, the perimeter side 22 is spaced away from the perimeter edge of the foot 100 such that the water that moves along the slots 25 on the top shelf passes through a gap formed between the foot and the perimeter side 22. This water then moves into the slots 25 in the bottom section 14.

The bottom 21 forms the floor of the landing pad 10 and spaces the foot 100 away from the ground. The bottom 21 includes an upper side 28 that contacts against the foot 100, and an opposing lower side 29 that contacts the ground. The upper side 28 further include the slots 25 to drain the water.

The lower side 29 can include treads, protrusions, and the like to prevent slipping during contact with the ground. The bottom 21 further includes a cut-out 27 that forms a portion of the bottom opening 15.

The first and second sections 20, 30 further include front edges 26 configured to abut together when the first and second sections 20, 30 are connected. As illustrated in FIG. 4A, the front edge 26 includes a first span 51 on a first side of the cut-out 27 and a second span 52 on the second side of the cut-out 27.

The front edge 26 further includes an extension 40 on one of the spans 51,52, and a corresponding receptacle 41 on the opposing span 51, 52. The extension 40 extends outward from the front edge 26 and is shaped and sized to fit into the corresponding receptacle 41 that extends into the front edge 26. The extension 40 and the receptacle 41 have complementary shapes to mesh together when the first and second sections 20, 30 are connected together.

The front edge 26 also include mating features 60 that engage together when the first and second sections 20, 30 are connected. The mating features 60 provide for aligning the first and second sections 20, 30. The mating features 60 also preventing water and/or debris on the ground from moving upward through the bottom section 14 of the landing pad 10.

Figure 5:
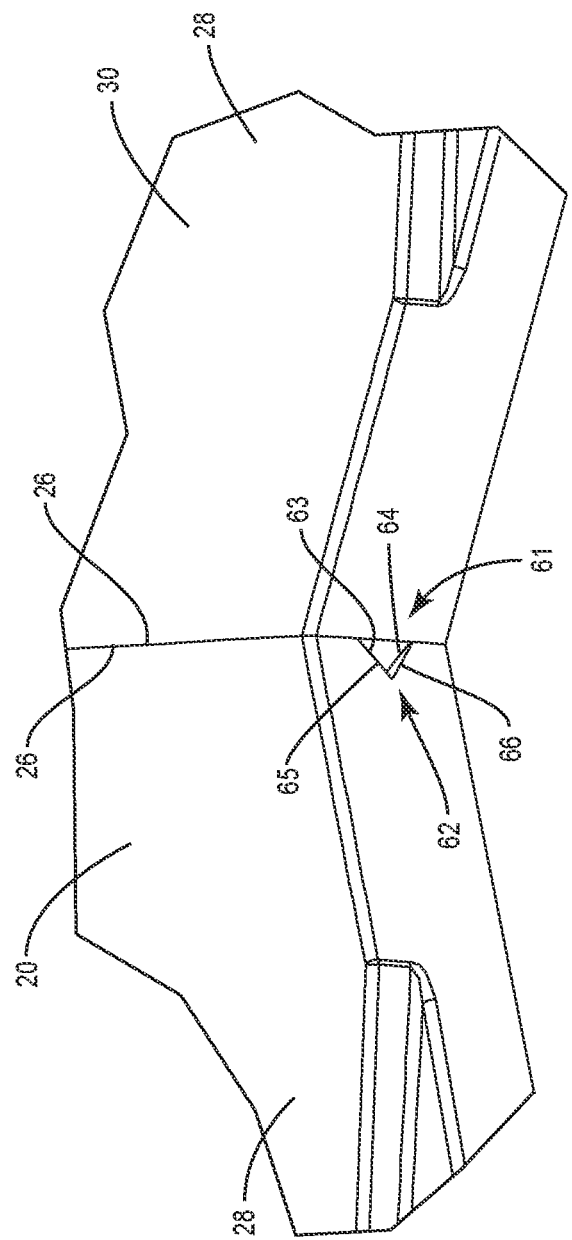
FIG. 5 is a perspective view of mating features of first and second sections of a landing pad being engaged together.

As illustrated in FIGS. 4A and 5, the mating features 60 include an extension 61 along one of the spans 51,52, and a corresponding receptacle 62 along the other span 51, 52. The mating features 60 can include various shapes and sizes. In one example, the extensions 61 include flat surfaces 63, 64 that are aligned at an acute angle to form an extension point. The receptacles 62 include flat surfaces 65, 66 that are aligned at an acute angle and form an inner point. When the first and second sections 20, 30 abut together, the surfaces 63, 64 of the extensions 61 contact against and slide along the surfaces 65, 66 of the receptacles 62. When fully abutted together, the extension point is aligned with an in proximity to the inner point. The sliding of the surfaces 63, 64, 65, 66 during engagement aligns the first and second sections 20, 30. In one example, the alignment provides for the upper sides 28 and/or lower sides 29 of the bottoms 21 to be aligned in common planes. The mating features 60 act as a dam to prevent the passage of water and/or debris through the bottom section 14. The mating features 60 also provide an aesthetically pleasing appearance by maintaining a connection between the two sections 20, 30.

The mating features 60 have elongated shapes that extend across the spans 51, 52. In one example as illustrated in FIG. 4A, extension 61 extends between the extension 40 and the cut-out 27. Likewise, the receptacle 62 extends between receptacle 41 and the cut-out 27. In one example, the mating features 60 extend across the entire length of the spans 51,52. In other examples, the mating features 60 are shorter than the spans 51, 52.

The first and second sections 20, 30 include openings 42 to receive the fasteners 102. The openings 42 align when the first and second sections 20, 30 are mated together. In one example, each of the first and second sections 20, 30 include a first opening 42 in the extension 40 and a second opening 42 in the top shelf 23 at the receptacle 41. When the first and section sections 20, 30 align together, the openings 42 align together to receive the fasteners 102. In one example, the aligned openings are exposed at the top of the landing pad 10 to provide for the fasteners to be inserted from the top. This facilitates attachment by providing for the first and second sections 20, 30 to be fastened together when positioned on the ground. Further, the fasteners 102 can be inserted by hand into the first and second sections 20, 30 without the need for tools. Likewise, the fasteners 102 can be removed from the openings 42 when the landing pad 10 is on the ground. The fasteners 102 are exposed and can be removed by hand and without the need for tools.

Figure 6:
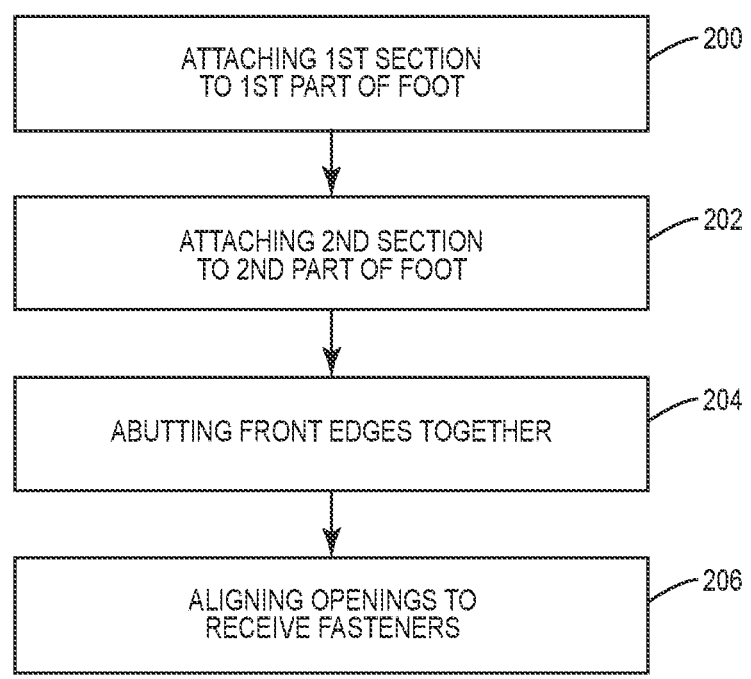
FIG. 6 is a flowchart diagram of a method of attaching a landing pad to a foot.

FIG. 6 illustrates a method of attaching the landing pad 10 to a foot 100 of a vehicle support. A first section 20 of the landing pad 10 is slid from a first direction onto a first part of the foot 100 (block 200). This sliding motion inserts a perimeter edge of the first part of the foot into a receptacle 24 in the first section 20 of the landing pad 10. A second section of the landing pad 10 is slid in a second direction onto a second part of the foot (block 202). This inserts a perimeter edge of the second part of the foot 100 into a receptacle 24 in the second section 30 of the landing pad 10. The order of attachment of the first and second sections 20, 30 can vary. One of the first and second sections 20, 30 can be fully mounted onto the foot 100, followed by the other section. In another example, the two sections 20, 30 can be simultaneously inserted onto the foot 100.

Front edges 26 of the first and second sections 20, 30 are abutted together (block 204). This can include one or more of the front edges 26 contacting together, the extensions 40 inserting into the receptacles 41 and the mating features 60 engaging together. Openings 42 on the first and second sections 20, 30 are aligned together and one or more fasteners 102 are inserted into the aligned openings to connect the sections 20, 30 together (block 206). The aligned openings 42 can be accessible from the top of the landing pad 10. This provides for the fasteners 102 to be inserted into the sections 20, 30 from the top of the landing pad 10.

The landing pad 10 can be constructed from a variety of different materials including rubber. In one specific example, the landing pad 10 is constructed from EPDM rubber. In one example, the landing pad 10 is constructed entirely from a single material. Other examples include different sections of the landing pad 10 constructed from different materials.

In the vary uses, the ground can include a variety of different surfaces. In one example with use on an RV, the ground is formed by the surface of a camping spot or a parking lot. In another example, the vehicle is positioned inside (e.g., garage) and the ground is a floor of a building.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A landing pad that mounts to a foot of a vehicle support, the landing pad comprising:

a bottom comprising a central opening;

a side wall that extends upward from the bottom, the side wall positioned around a perimeter of the bottom;

a top shelf that extends radially inward towards the central opening from the side wall, the top shelf extending over and being spaced away from the bottom; and one or more slots comprising a first section that extends into a lower surface of the top shelf and a second section that extends into a top surface of the bottom with the first section extending a limited distance into the lower surface of the top shelf to be spaced from and not visible along an upper surface of the top shelf, the first section and the second section of each of the one or more slots being aligned to direct water to the central opening.

2. The landing pad of claim 1, wherein the one or more slots comprise a plurality of slots that are aligned parallel to each other.

3. The landing pad of claim 1, wherein the second sections of the one or more slots are sloped towards the central opening.

4. The landing pad of claim 1, wherein each of the slots comprise the first section overlapping with the second section.

5. The landing pad of claim 1, further comprising a receptacle formed between the bottom and the top shelf at the side wall, the receptacle configured to receive an outer perimeter edge of the foot.

6. The landing pad of claim 1, wherein the landing pad comprises a first section configured to be positioned on a first part of the foot and a second section configured to be positioned on a second part of the foot, the first section and the second section being identical in shape and size.

7. The landing pad of claim 1, wherein the landing pad comprises identical sections that mate together, each of the sections comprising:
a front edge;
an extension that extends outward from the front edge;
a receptacle that extends into the front edge;
wherein the extension is shaped and sized to fit into the receptacle when the sections are mated together.

8. The landing pad of claim 7, wherein each of the sections comprises a cut-out section that form the central opening in the bottom when the sections are mated together.

9. The landing pad of claim 7, where each of the sections comprises mating features that engage together when the sections are mated together, the mating features forming a dam to prevent water passage from an underside of the landing pad.

10. A landing pad that mounts to a foot of a jack, the landing pad comprising:
a first section comprising:
a first bottom comprising a first top surface and with a first front edge;
a first side wall that extends upward from the first bottom, the first side wall positioned along a perimeter of the first bottom away from the first front edge;
a first top shelf that extends radially inward from the first side wall, the first top shelf extending over and being spaced away from the first bottom by a first gap;
a second section comprising:
a second bottom comprising a second top surface and with a second front edge;
a second side wall that extends upward from the second bottom, the second side wall positioned along a perimeter of the second bottom away from the second front edge;
a second top shelf that extends radially inward from the second side wall, the second top shelf extending over and being spaced away from the second bottom by a second gap;
the first section and the second section configured to be selectively positioned in a disconnected configuration and a connected configuration;
the disconnected configuration comprising the first section spaced away from the second section;
the connected configuration comprising:
the first front edge abutting against the second front edge;
a continuous bottom section formed by the first bottom and the second bottom;
a continuous side wall formed by the first and second side walls; and
wherein the first section and the second section are identical.

11. The landing pad of claim 10, wherein each of the first section and the second section further comprise:
a central cut-out in the front edge;
a projection that extends outward from the front edge;
a receptacle that extends into the front edge;
wherein in the connected configuration:
the central cut-outs are aligned together and form a single central opening;
the projection of the first section mates with the receptacle of the second section; and
the projection of the second section mates with the receptacle of the first section.

12. The landing pad of claim 11, wherein each of the first and second sections comprise:
a mating projection that extends outward from the front edge and extends between the projection and the central cut-out; and
a mating receptacle that extends into the front edge between the receptacle and the central cut-out.

13. The landing pad of claim 10, further comprising a plurality of slots formed in each of the first and second sections, each of the slots comprising:
a first portion that extends into the respective first and second top shelves;
a second portion that extends into the respective first and second bottoms;
the first portions and the second portions aligned in an overlapping arrangement.

14. The landing pad of claim 10, wherein each of the first section and the second section comprise openings that are exposed on a top surface, the openings of the first section aligned with the openings of the second section in the mated configuration to receive fasteners.

15. A method of attaching a landing pad to a foot of a vehicle support, the method comprising:
sliding in a first direction a first section of the landing pad onto a first part of the landing pad and inserting a perimeter edge of the first part of the landing pad into a first receptacle in the first section;
sliding in an opposing second direction a second section of the landing pad onto a second part of the landing pad and inserting a perimeter edge of the second part of the landing pad into a second receptacle in the second section;
abutting together front edges of the first and second sections and inserting projections on the front edges into receptacles in the front edges;
mating together mating features on the front edges of the first and second sections and creating water blocks and preventing water from passing through the landing pad with the mating features being spaced away from the projections and the receptacles; and inserting one or more fasteners into openings in the projections and receptacles and connecting together the first and second sections with the fasteners spaced away from the mating features along the front edges.

16. The method of claim 15, further comprising inserting the one or more fasteners into the openings from a top side of the first and second sections.

17. The method of claim 16, further comprising aligning slots in the first and second sections on opposing sides of the landing pad, the slots extending into the first and second sections and configured to drain water from the landing pad.

* * * * *